Jan. 7, 1936.  J. F. RALEIGH  2,026,653
RADIATOR SHUTTER
Filed Oct. 9, 1931   2 Sheets-Sheet 1
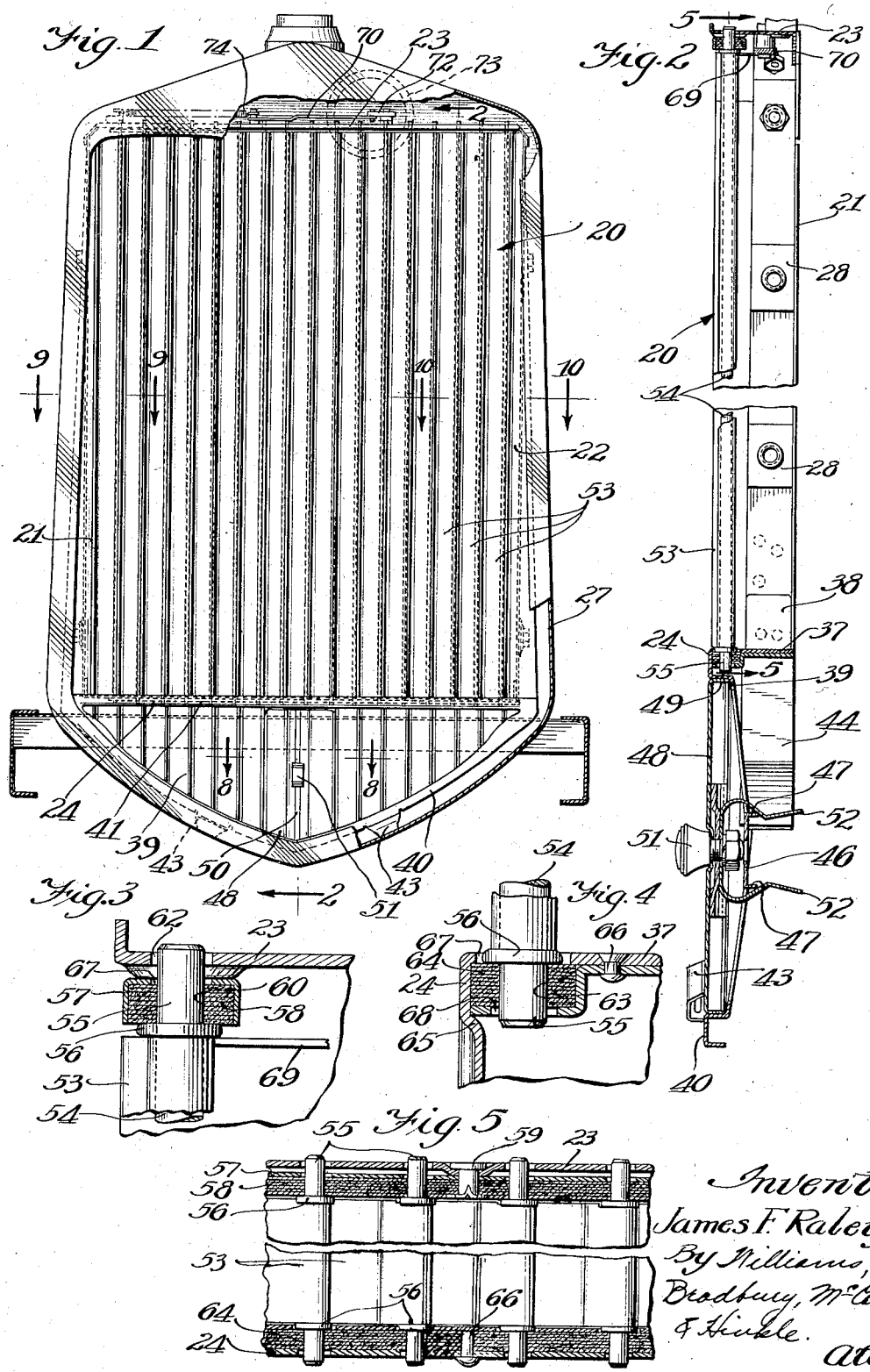

Jan. 7, 1936.                J. F. RALEIGH                2,026,653
                            RADIATOR SHUTTER
                          Filed Oct. 9, 1931          2 Sheets-Sheet 2
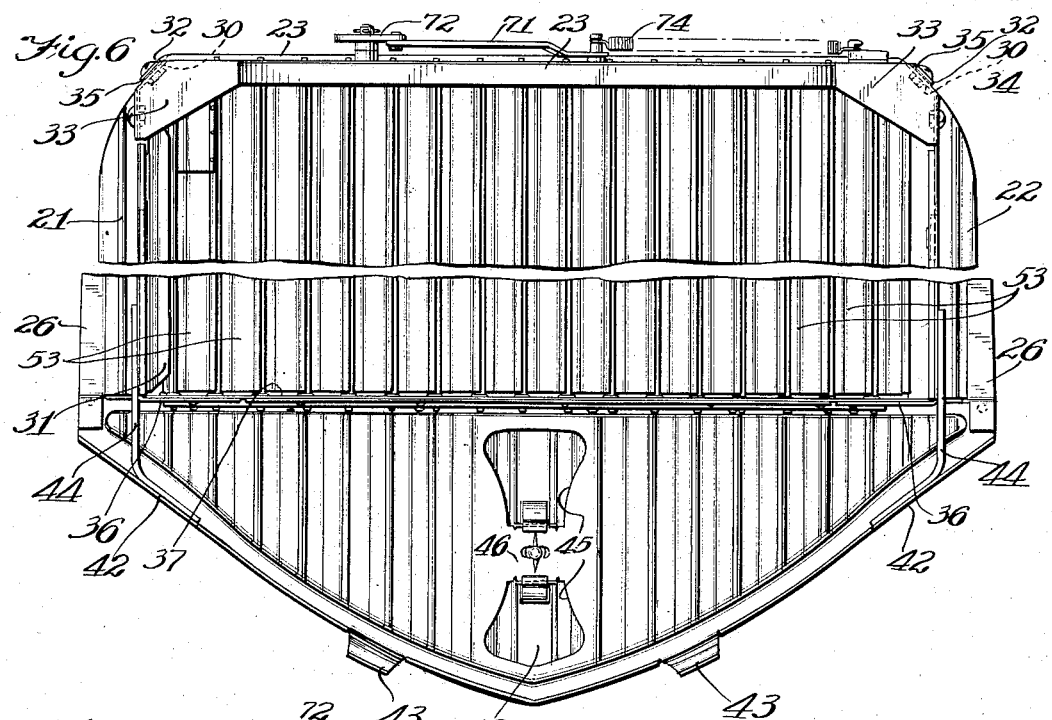

Patented Jan. 7, 1936

2,026,653

UNITED STATES PATENT OFFICE 2,026,653

RADIATOR SHUTTER

James F. Raleigh, River Forest, Ill., assignor to Pines Winterfront Company, Chicago, Ill., a corporation of Delaware Application October 9, 1931, Serial No. 567,777

14 Claims. (Cl. 189—62)

This invention relates to radiator shutters suitable for use with automotive vehicles.

One of the objects of the invention is to provide an improved radiator shutter.

A further object of the invention is to produce a radiator shutter which will not rattle even after considerable usage.

A further object of the invention is to provide an improved bearing for rotatably supporting a series of shutters.

A further object of the invention is to provide a radiator shutter having a depending apron with means for rigidly supporting the apron from the shutter frame.

A further object of the invention is to provide an improved closure for the crank opening in a radiator shutter.

A further object of the invention is to provide a radiator shutter which may be secured directly to the radiator shell.

Other objects and advantages will appear from the following description of a preferred embodiment taken in conjunction with the acompanying drawings, in which Fig. 1 is a front elevation, partly broken away, of a radiator shutter embodying the invention, mounted upon an automobile radiator;

Fig. 2 is a sectional view of the shutter, on a larger scale, taken on the line 2—2 of Fig. 1;

Figs. 3 and 4 are sectional detail views showing portions of Fig. 2 on an enlarged scale;

Fig. 5 is a sectional detail view, on an enlarged scale, taken on the line 5—5 of Fig. 2;

Fig. 6 is a rear elevational view of the shutter, the intermediate portion being omitted;

Fig. 7 is a side elevational view of the shutter;

Fig. 8 is a sectional detail view on the line 8—8 of Fig. 1;

Fig. 9 is a sectional detail view on a larger scale taken on the line 9—9 of Fig. 1; and Fig. 10 is a similar view on the line 10—10 of Fig. 1.

Referring to the drawings, the shutter as a whole is designated generally by the numeral 20. The shutter comprises side frame members 21 and 22, an upper frame member 23, and a lower frame member 24 rigidly secured to the side frame members.

As shown in Fig. 9 the side frame member 21 comprises an inwardly directed channel, the forward web 25 of which extends forwardly and inwardly. The web 25 carries an outwardly directed flange 26 which is fluted or corrugated to simulate shutters and is shaped to conform with the radiator shell 27 into which it is adapted to extend. The channel 21 has secured therein, for example by welding, blocks 28 having threaded openings whereby the shutter may be mounted on forwardly extending flanges 29 carried by the core of the radiator.

The flanges of the side frame member 21 are cut away at their upper end and the main web is bent inwardly obliquely to provide a lug 30.

The frame member 22 is of similar construction and its various parts are indicated by the same reference numerals. This frame member is provided with a strip of metal 31 which lies along the main web of the channel and along part of the forward web 25, and is provided with a marginal portion which extends inwardly beyond the web 25, into position behind the axis of the proximate shutter.

The upper frame member 23 is provided with a small upturned flange on its forward edge and with a larger downwardly directed flange on its rear edge. Its ends are cut away and bent downwardly to provide lugs 32. Corner plates 33 are welded to the rear flange of the upper frame member 23, said plates being provided with forwardly turned lugs 34 and 35, the lugs 34 being bolted to the side frame members 21 and 22, and the lugs 35 being located between lugs 30 and the lugs 32, the lugs 30, 35 and 32 being bolted together.

The lower ends of the side frame members 21 and 22 carry integral extensions 36 which are turned inwardly to engage the underside of a horizontal flange 37 which forms part of the lower frame member 24. The flange 37 is provided with lateral extensions 38 which are bent upwardly to engage the inner sides of the main webs of the side frame members 21 and 22. The extensions 36 and 38 are secured to the flange 37 and side frame members 21 and 22 respectively by spot welding or other suitable means.

The lower frame member 24 preferably comprises the horizontal flange 37 and the apron 39 which extends downwardly below the shutters. The apron 39 extends laterally beyond the main webs of the side frame members 21 and 23 and may be secured to the outwardly directed flanges 26 of these frame members by means of lugs carried by said flanges which may be spot welded to the apron on the rear side thereof as shown in Fig. 6. The apron 39 is preferably fluted or corrugated so as to simulate the shutters, which as will be hereinafter described, are mounted in the opening defined by the frame members 21 to 24. The apron 39 is provided around its outer edge with a bead 40 which is adapted to engage the inner edge of the shell as shown in Fig. 1. The form of the outer edge of the apron 39, will, of course, depend upon the shape of the shell with which it is to be used. Between the flange 37 and the apron 39, the bottom frame member 24 is formed into bead 41 which presents the outward appearance of a bar and serves for a purpose hereinafter described.

Along the lower edge of the bead 40 extends a rearwardly directed flange 42, which is slit to provide lugs 43 which are formed so that they engage the inside of the shell, as shown in Fig. 1, said lugs and shell being provided with openings adapted to receive bolts to secure the shutter and shell together. The portions of the flange 42 adjacent the sides of the shutter are substantially wider than the intermediate portion. These end portions are secured to and supported from the side frame members 21 and 22 by means of metal strips 44 which are bent to the appropriate angle and are welded to the outside of the main webs of the side frame members, at their lower ends and to the end portions of the flange 42.

The central portion of the apron 39 is dished inwardly and is cut out to provide an upper and lower opening 45, one of which serves as a crank opening. Between the openings 45 is left a bridge piece 46 which is provided at top and bottom with inwardly extending flanges 47. The dished portion of the apron 39 is adapted to receive a panel 48 which extends between the beads 40 and 41, and is fluted or corrugated to match the portions of the apron 39 on either side. The panel 48 is provided around its edge with a flange 49 which positions it so that its fluted surface lies in uniform relation with respect to the fluted portions of the apron 39. The panel 48 is provided with a central rib 50 which serves to strengthen it. The panel 48 is provided with a handle 51 which is associated with a spring 52, carried on the inner side of the panel. As clearly shown in Fig. 2, the spring 52 is bifurcated and its legs are formed so as to enter the openings 45 and engage the flanges 47 of the bridge piece 46 in such a manner that the panel 48 is securely held in position until it is desired to remove it.

In the opening defined by the frame members 21, 22, 23 and 24 are pivotally mounted a series of shutters 53. In the embodiment shown the shutters are arranged vertically and are pivotally supported in bearings carried by the upper and lower frame members 23 and 24. The invention is not intended to be limited to such construction since it is equally applicable to horizontally arranged shutters.

Each shutter 53 may suitably consist of a strip of metal of suitable form having one longitudinal edge portion curled or formed into tubular shape to embrace a rod 54, the ends of which project beyond the ends of the shutter to provide pintles 55 for its support. Adjacent the top and bottom edge of the shutter strip, integral collars 56 are formed on the rod 54 to provide thrust collars or bearings to provide axial support for the shutter 53 and limit its axial movement in both directions.

Along the forward edge of the upper frame member 23 and on the underside thereof, is mounted metal channel strip 57, which is preferably downwardly directed, as shown in the drawings. This channel strip contains a bearing strip 58 preferably of fibrous material as will hereinafter be more particularly described. The channel strip 57 and bearing strip 58 are secured together and to the upper frame member 23 by suitable means, for example by tubular rivets 59.

The bearing strip 58 is provided with openings 60 in which the upper pintles 55 have a bearing fit. The channel strip 57 and upper frame member 23 are provided with openings 61 and 62 in alignment with the openings 60. The openings 61 and 62 are larger than the openings 60 and the pintles 55 so that the pintles do not contact with the channel strip 57 or the upper frame member 23. The thrust collars 56 are adapted to cooperate with the under face of the bearing strip 58 to prevent upward displacement of the shutters.

The lower pintles 55 are received in openings 63 in a bearing strip 64 preferably of fibrous material similar to the strip 58. The strip 64 is supported on the underside of the flange 37 of the lower frame member 24 by means of a metal strip 65 which is stepped downwardly adjacent its forward edge, as shown in Figs. 2 and 4 to engage the rear face and underside of the strip 64. The forward face of the strip 64 abuts upon the inner face of the bead 41. The strip 65 is secured to the flange 37 by means of rivets 66, some of which extend through the bearing strip 64 to maintain it in position. The flange 37 and the strip 65 are provided with openings 67 and 68 respectively in alignment with the openings 63 of the bearing strip 64. The openings 68 are larger than the openings 63 and the pintles 55 so that the latter may extend therethrough without contacting with the strip 65. The openings 67 are relatively large so that the lower thrust collars 58 may enter same and bear upon the bearing strip 64 without contacting with the lower frame member.

At their upper ends the shutters 53 are provided with rearwardly extending arms 69 which are pivotally connected to a common actuating bar 70. The actuating bar is connected by a link 71 to a bell crank lever 72 pivotally mounted on the upper frame member 23 and adapted to be operated by any suitable means, for example, a thermostat 73, to open the shutter when predetermined conditions are attained. A spring 74 connected to the frame member 23 and to the link 71 tends to maintain the shutters closed.

The shutter 20 is mounted in any suitable manner so as to control the passage of air through the radiator. It may suitably be mounted behind the radiator shell 27 and in front of the radiator.

The bearing strips 58 and 64 are preferably formed of non-metallic material of sound deadening characteristics so that lateral movements of the pintles in their bearing openings which may develop after long use, will not produce noise. The strips 58 and 64 are preferably formed from fibrous material and it is preferred to employ strips made up from a large number of laminations 75, secured together by pressure or by adhesives.

Suitable strips may be produced by compressing together a large number of sheets of paper, such as stout manila paper or thin cardboard while damp so that a single sheet of suitable thickness may be formed. It is preferred to impregnate the board either during or after its manufacture with suitable liquids which may have a bonding and preferably a lubricating effect. It is preferred to impregnate the board with a liquid containing glycerine, although other liquids such as linseed oil, mineral oil and the like may be employed.

By constructing the strips 58 and 64 from laminations the fibers lie in parallel planes at right angles to the axis of the pintles. The fibers thus located offer much greater resistance to wear and displacement than do fibers located in every direction as in the case of board formed directly from fiber pulp.

The impregnating fluids which are preferably employed provide a continuous source of lubricant for the pintles so that their wear will be minimized without the necessity of inspection or attention.

While I have disclosed the invention in connection with the specific details of a preferred embodiment thereof, it must be understood that the invention is not intended to be limited to such details, except insofar as set forth in the accompanying claims.

What I claim as new and desire to secure by Letters Patent of the United States is:

1. A radiator shutter comprising frame members defining an opening through which air is adapted to flow, shutters having pintles mounted in said opening to control the flow of air therethrough, a metal channel strip mounted on one of the frame members, a strip of fibrous material located in said channel strip, and means passing through the frame member, channel strip and fibrous strip securing same together, the fibrous strip having openings adapted to receive and support the pintles of the shutters and maintain the pintles out of contact with the channel strip and frame member.

2. A radiator shutter comprising frame members defining an opening through which air is adapted to flow, shutters having pintles mounted in said opening to control the flow of air therethrough, a metal channel strip mounted on one of the frame members, a strip of fibrous material located in said channel strip, and means passing through the frame member, channel strip and fibrous strip securing same together, the fibrous strip having openings adapted to receive and support the pintles of the shutters, the channel strip and frame member having aligned openings larger than the pintles to prevent contact of the pintles therewith.

3. In a radiator shutter, in combination, a series of shutters having pintles, a bearing strip of fibrous material having openings in which the pintles are rotatably supported, and sheet metal members completely enclosing and supporting said strip, said members being perforated to permit the pintles to enter the openings in the bearing strip and prevent contact of the pintles with the metal members.

4. In a radiator shutter, in combination, a frame member, a series of shutters having pintles, and thrust collars thereon, a bearing strip of fibrous material mounted on the frame member on the side thereof remote from the shutters, and means securing the bearing strip to the frame member, said bearing strip being provided with openings to receive the pintles and said frame member being provided with larger aligned openings to receive the thrust collars and permit same to bear upon the bearing strip without contacting with the frame member.

5. In a radiator shutter, in combination, a frame member, a series of shutters having pintles and thrust collars thereon, a bearing strip of fibrous material mounted on the frame member on the side thereof remote from the shutters, a metal strip on the side of the bearing strip remote from the frame member, and means extending through the frame member, bearing strip and metal strip securing same together, said bearing strip being provided with openings, to receive the pintles, said metal strip being provided with larger aligned openings to avoid contact between the metal strip and the pintles, and said frame member being provided with larger aligned openings to receive the thrust collars and permit same to bear upon the bearing strip without contacting with the frame member.

6. In a radiator shutter, in combination, a series of shutters having pintles, a bearing strip built up from a plurality of laminations of fibrous material, and having openings in which the pintles are rotatably supported, and sheet metal members completely enclosing and supporting said strips, said members being perforated to permit the pintles to enter the openings in the bearing strip and prevent contact of the pintles with the metal members.

7. A radiator shutter comprising frame members defining an opening through which air is adapted to flow, shutters mounted in said opening to control the flow of air therethrough, means mounted on opposed frame members adapted to support strips built up of a large number of laminations of non-metallic sound deadening material, and pintles on said shutters having bearing support in said strips and maintained out of contact with the metal parts of the frame.

8. A radiator shutter comprising frame members defining an opening through which air is adapted to flow, shutters having pintles mounted in said opening to control the flow of air therethrough, a metal channel strip mounted on one of the frame members, a strip of fibrous material impregnated with a lubricating fluid located in said channel strip, and means passing through the frame member, channel strip and fibrous strip securing same together, the fibrous strip having openings adapted to receive and support the pintles of the shutters and maintain the pintles out of contact with the channel strip and frame member.

9. In a radiator shutter, in combination, a frame member, a series of shutters having pintles and thrust collars thereon, a bearing strip built up from a large number of laminations, and impregnated with lubricating liquid, mounted on the frame member on the side thereof remote from the shutters, and means securing the bearing strip to the frame member, said bearing strip being provided with openings to receive the pintles and said frame member being provided with larger aligned openings to receive the thrust collars and permit same to bear upon the bearing strip without contacting with the frame member.

10. A radiator shutter comprising a frame, shutters mounted therein, an apron extending downwardly from the frame, said apron being provided with a flange at its lower edge, and metal strips secured to the frame and to the flange for rigidly supporting the apron.

11. In combination, a radiator shutter comprising a frame, shutters mounted therein, an apron extending downwardly from the frame, a radiator shell adapted to surround said shutter, and means securing the apron directly to the shell.

12. A radiator shutter comprising a frame, shutters mounted therein, an apron extending downwardly from the frame, a flange carried by the apron around its outer edge, lugs extending downwardly from the apron adapted to be secured to a radiator shell, and metal strips secured to the frame and to the flange whereby the apron is rigidly supported.

13. A radiator shutter comprising a frame, shutters mounted therein, an apron extending downwardly from the frame, said apron being provided with a pair of adjacent openings leaving a bridge piece therebetween, one of said openings being adapted to be used as a crank opening, a closure for said openings, and a resilient bifurcated member carried by said closure and adapted to engage the bridge piece to secure the closure in position on the apron.

14. A radiator shutter comprising a frame, shutters mounted therein, an apron extending downwardly from the frame, said apron being dished centrally and said dished portion being provided with a pair of adjacent openings leaving a bridge piece therebetween, one of which openings is adapted to serve as a crank opening, a closure panel adapted to be seated in said dished portion of the apron, and a bifurcated spring adapted to engage opposite sides of said bridge piece and secure the closure panel to the apron.

JAMES F. RALEIGH.